(12) United States Patent
Woodill et al.

(10) Patent No.: US 6,710,955 B2
(45) Date of Patent: Mar. 23, 2004

(54) METHOD AND APPARATUS FOR CONVERTING AN ANALOG AUDIO SOURCE INTO A DIGITAL FORMAT

(75) Inventors: Joseph Woodill, Lawrenceville, NJ (US); Robert Smith, Levittown, PA (US); Wheeler Berlus, Pemberton, NJ (US); Leo Haninczak, Hamilton, NJ (US); David Kozemchak, Hamilton, NJ (US)

(73) Assignee: Recording for the Blind & Dyslexic Incorporated, Princeton, NJ (US)

( * ) Notice: Subject to any disclaimer, the term of this patent is extended or adjusted under 35 U.S.C. 154(b) by 273 days.

(21) Appl. No.: 09/872,889

(22) Filed: Jun. 1, 2001

(65) Prior Publication Data

US 2003/0081336 A1 May 1, 2003

(51) Int. Cl.[7] .................................................. G11B 5/09
(52) U.S. Cl. ............................. 360/32; 360/12; 360/31; 360/72.2; 434/316
(58) Field of Search .................. 381/56; 369/27.01, 369/28.01, 70; 434/308, 316, 319; 704/207, 208, 210, 215, 214, 211, 270, 271; 360/32, 53, 65, 12, 31, 69, 72.2, 72.1, 79; 700/94

(56) References Cited

U.S. PATENT DOCUMENTS

| | | | |
|---|---|---|---|
| 4,673,993 A | * 6/1987 | McCaughey | 360/79 |
| 4,884,972 A | 12/1989 | Gasper | 434/185 |
| 4,972,190 A | 11/1990 | Primeau et al. | |
| 4,992,892 A | 2/1991 | Yamada et al. | |
| 5,127,303 A | 7/1992 | Tsumura et al. | |
| 5,609,487 A | 3/1997 | Setlabudi et al. | |
| 5,613,909 A | 3/1997 | Stelovsky | |
| 5,699,477 A | * 12/1997 | McCree | 704/216 |
| 5,782,692 A | 7/1998 | Stelovsky | |
| 5,867,330 A | 2/1999 | Tanaka | |
| 5,880,388 A | 3/1999 | Kajiyama et al. | |
| 5,897,324 A | 4/1999 | Tan | |
| 5,991,594 A | 11/1999 | Froeber et al. | |
| 6,301,513 B1 | * 10/2001 | Divon | 700/94 |

FOREIGN PATENT DOCUMENTS

GB  2306754 A  * 5/1997  ............... 360/32

* cited by examiner

Primary Examiner—Alan T. Faber
(74) Attorney, Agent, or Firm—Moser, Patterson & Sheridan, LLP; Kin Wah Tong, Esq.

(57) ABSTRACT

An apparatus and method for converting and improving an existing analog audio recording as it is converted into a digital format with reliable tone detection and interpretation. Specifically, the digitized audio undergoes three tone detection processing steps: silence detection and removal, anomaly detection and removal and page/chapter identification.

20 Claims, 2 Drawing Sheets

METHOD AND APPARATUS FOR CONVERTING AN ANALOG AUDIO SOURCE INTO A DIGITAL FORMAT

The present invention relates to an apparatus and concomitant method for converting an analog audio source into a digital format. Specifically, the present invention provides a method for converting and improving an existing analog audio recording as it is converted into a digital format. In performing the conversion function, the present invention is also capable of identifying and maintaining various index information stored in the original analog audio signal, e.g., the identification of various index tones.

BACKGROUND OF THE DISCLOSURE

As digital technologies continue to gain wide acceptance, a vast amount of previously stored information must be adapted into the new digital standards. Such previously stored information includes a vast library of existing analog-recorded books. To preserve the huge investment in such analog recordings, these recordings are being converted into digital format for implementation such as the Digital Talking Book (DTB) in accordance with the "Daisy" consortium specifications.

The electronic book is already available in various forms to the mainstream consumer. However, none of the current versions of widely available electronic books are accessible to the print disabled. The print disabled community includes blind as well as learning disabled readers. Previously, this population has been afforded the option of the analog talking book. The analog talking book generally includes audio with embedded index tones indicating pages and chapters. The user must listen to the audio at fast forward to hear index tones and use the tones to navigate linearly to the desired section of the recorded book. Most recently, there have been efforts to produce digital books, which afford users the opportunity to navigate non-linearly through the recorded material.

There is currently an effort underway to convert large libraries of valuable analog talking books to new digital talking book formats. Since the digital talking books represent a revolutionary advantage for the print disabled community, there is a great deal of urgency attached to these conversion efforts. To satisfy this urgent need, an analog to digital talking book conversion system is required.

One particularly problematic aspect of the conversion has been automatic and accurate index tone detection and interpretation. Talking books have, especially in the United States, been largely produced by volunteer organizations. As such, these books display a wide range of non-uniform characteristics. This lack of consistency makes the problem of building an automated conversion system a difficult one, since the system must accommodate a wide range of inputs. A number of different technologies, including phrase detection methods, have been tested and proven unreliable and unable to accommodate the wide range of inputs when used to convert some formats of analog talking book. Efforts to convert books manually have also proven difficult. While brute force methods can be utilized to accomplish the desired complex tasks, such solutions are often too costly to be practical.

Therefore, there is a need for an apparatus and method for converting and improving an existing analog audio recording as it is converted into a digital format with reliable tone detection and interpretation.

SUMMARY OF THE INVENTION

One embodiment of the present invention provides an apparatus and method for converting and improving an existing analog audio recording as it is converted into a digital format with reliable tone detection and interpretation. Specifically, the digitized audio undergoes three tone detection processing steps: silence detection and removal, anomaly detection and removal and page/chapter identification.

Finally, the audio undergoes an audio optimization processing, where the audio is adjusted from 2× speed playback to standard speed playback by performing pitch correction on the audio files. Pitch correcting the audio by a factor of −11 semitones slows the audio for standard speed playback. Audio is optimized for conversion to audio compression formats by removing low frequencies below 60 Hz, boosting the high bass (120–200 Hz) and upper midrange frequencies (2–6 kHz). The files are then normalized and saved so that all audio has equal amplitude.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
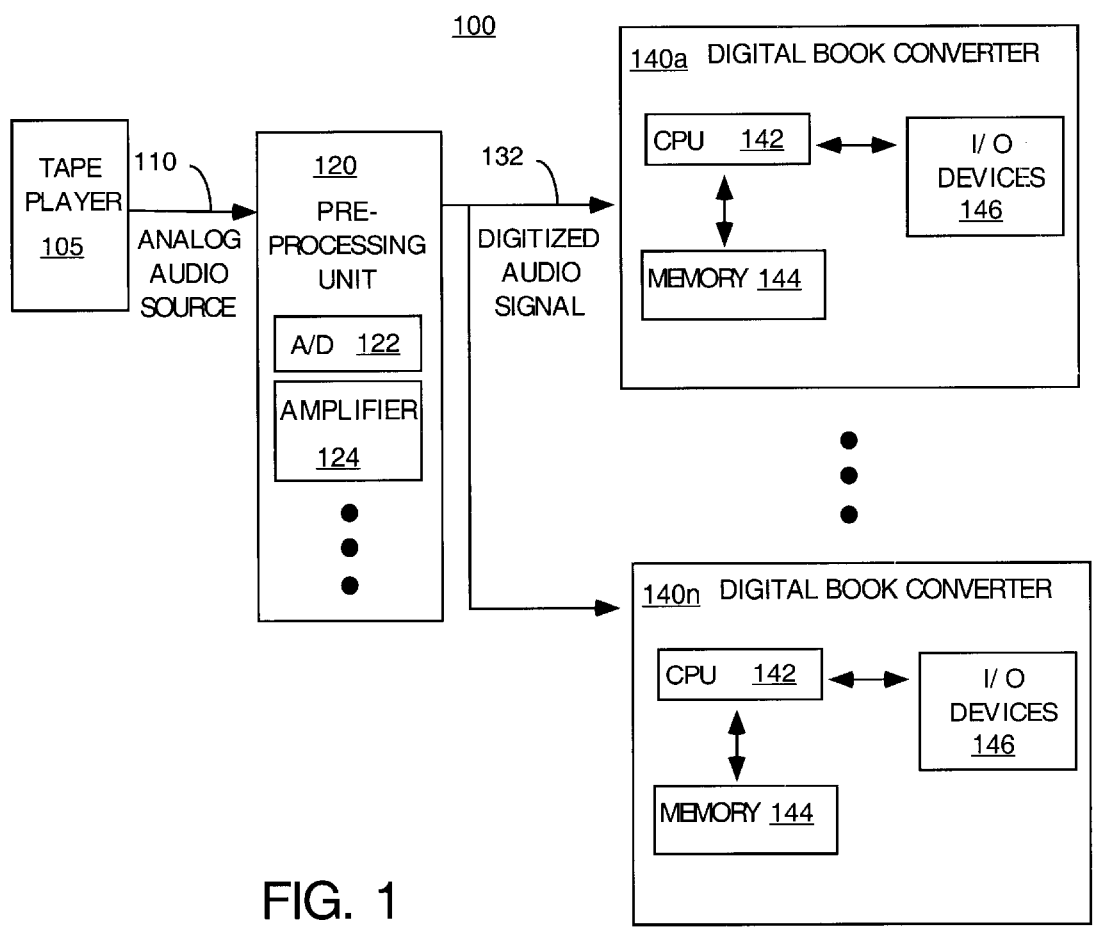
FIG. 1 depicts a block diagram of the present invention for converting and improving an existing analog audio recording as it is converted into a digital format with reliable tone detection and interpretation.

The present invention provides an apparatus and method for converting and improving an existing analog audio recording as it is converted into a digital format with reliable tone detection and interpretation. Specifically, FIG. 1 illustrates a block diagram of an analog to digital talking book conversion system 100 of the present invention having a tape player 105, a pre-processing unit 120 and one or more digital book converters 140*a–n*.

In operation, a source of audio data on path 110 is pre-processed by the pre-processing unit 120 into appropriate digital formats. For example, the audio source is an analog audio signal representative of an analog audio book that is generated from an analog tape player 105, e.g., a four track analog tape player. Specifically, the analog signal on path 110 is digitized by analog-to-digital (A/D) converter 122 and amplified by the amplifier 124.

In turn, the digitized audio signal is then forwarded to one or more digital book converters 140*a–n*, where various audio signal processing functions are applied to the digital audio signals, e.g., index tone detection and interpretation, and various audio quality improvement processing. In brief, the digital book converter produces digital audio files and corresponding files containing a list of beep tone time locations for each analog tape that is converted. A detailed discussion of each of these functions is provided below.

In one embodiment, each of the digital book converters 140*a–n* is implemented using a general purpose computer having a central processing unit (CPU) 142, a memory 144, and various Input/Output (I/O) devices 146. The input and output devices 146 may comprise a keyboard, a mouse, a modem, a camera, a camcorder, a video monitor, one or more soundcards (e.g., the Yamaha DS2416 soundcard with two AX44 analog interfaces), any number of imaging devices or storage devices, including but not limited to, a tape drive, a floppy drive, a hard disk drive or a compact disk drive. The general purpose computer allows an operator to efficiently effect digital talking book conversion using existing analog talking books.

In the preferred embodiment, various functions of the digital book converter 140 as discussed below are implemented (in part or in whole) by one or more software applications that is loaded from a storage device and resides in the memory 144 of the computer. As such, the digital book converter 140 and associated methods and/or data structures of the present invention can be stored on a computer readable medium. Finally, although the present invention is disclosed where the digital book converter is a personal computer (PC), it should be noted that the general purpose computer of the digital book converter 140 should be broadly interpreted to include one or more personal computers, servers, main frames and the like.

Figure 2:
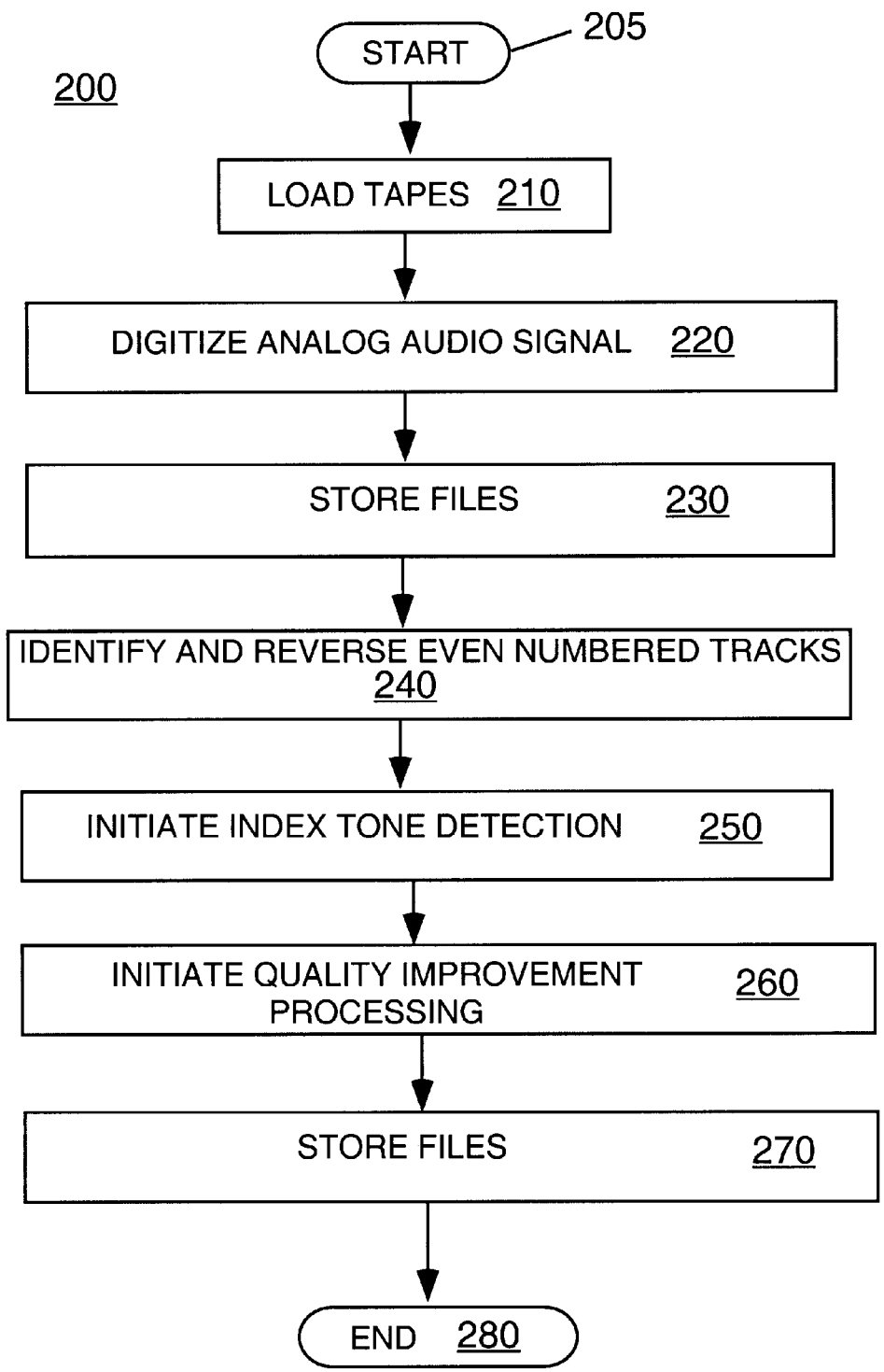
FIG. 2 depicts a block diagram of a flowchart of the method of the present invention for converting and improving an existing analog audio recording as it is converted into a digital format with reliable tone detection and interpretation.

FIG. 2 depicts a block diagram of a flowchart of the method 200 of the present invention for converting and improving an existing analog audio recording as it is converted into a digital format. Method 200 starts in step 205 and proceeds to step 210.

In step 210, method 200 loads an analog audio signal into the system, e.g., by loading a tape into the tape player 105. Method 200 then proceeds to step 220.

In step 220, method 200 activates the tape player and digitizes the analog audio signal into a digital format. Specifically, in one embodiment of the invention, four channel outputs of a four-track analog tape machine are fed to a distribution amplifier 124. The distribution amplifier 124 splits the four channels into a pair of supplicate four channel groups for a total of eight channels. Each of the four channel groups is patched to a four channel analog interface housed in the computer 140. Each of the four channel analog interfaces is connected to a soundcard 146, also housed in the computer 140.

The amplification process is employed to effect index tone amplification and audio quality improvement that are performed at later steps. In fact, in one embodiment, playback of the analog source occurs at two times standard speed, so that all four tracks of the analog source can be fed into the conversion system in approximately thirty minutes and tone indexes can be more easily detected.

In step 230, method 200 stores the digitized audio signals and detected index audio tones into various files, e.g., four (4) audio track files and four (4) index tone files are stored on the storage device 146 of the digital book converter 140. For example, at the end of an analog to digital transfer time period, e.g., 30 minute, eight audio files are stored on the computer's hard drive: four quality improved audio files containing speech and four audio files containing amplified index tones without speech.

In step 240, method 200 identifies and reverses the stored "even numbered" tracks to eliminate idiosyncrasies associated with the analog tape source. Specifically, in the analog tape format, even numbered tracks are typically reversed. Since, for efficiency reasons, all tracks of the analog tape source are fed into the computer 140 simultaneously in a single playback direction, the even numbered tracks must now be reversed as an after-process. Even numbered tracks are automatically identified by the system and the audio files are fed automatically into a batch process in which they are reversed and then stored again.

In step 250, method 200 initiates tone detection. Specifically, the stored audio files containing amplified index tone events undergo several tone detection processing steps: 1) silence detection and removal, 2) anomaly detection and removal, 3) page/chapter identification, and 4) creation of Time Stamp Data (TSD) file.

First, silence detection and removal isolates index tone events. Specifically, for the silence detection and removal phase, audio files containing amplified tone events are analyzed to determine the amplitude and length of the events. Analysis and removal of silences are performed by filtering via a software application. Filter settings for silence detection and removal cam be set to:

| Filter Open Level | −25 db |
| Filter Close Level | −25 db |
| Attack | 1 ms |
| Hold | 1 ms |
| Granularity | 65 |

These current settings reflect the definition of an index tone as determined during testing. The settings are broad enough to allow for a percentage of variance from the published Recording For the Blind & Dyslexic (RFB&D) index tone specification. However, these settings can be adjusted to accommodate index tone definitions other than the RFB&D index tone specification.

Once silence detection and removal has been performed by the filter, audio tracks containing possible index tones are split into individual events. A data table is created with each item in the table describing a separate index tone event (see Table 1 below). Each index tone description in the data table contains the following items:

Audio track number

Event time offset in Hours:Minutes:Seconds:Frames (SMPTE format)

Identification of the event as an audio event

Name of track which contains event using TB-CON naming convention (ShelfNumber_TapeNumber-Track Number)

Length of the event expressed in samples

TABLE 1

Beep Tone Event List

| Track Number | Event Time Offset | Event Time Offset | Type of Event | Name of Track | Length of Event |
| --- | --- | --- | --- | --- | --- |
| 2 | 00:00:00:00 | 1:01:000 | [[N/a]] | Audio | DL635_9-02 | 1037347 samples |
| 1 | 00:01:00:29 | 31:02:113 | [[N/a]] | Audio | DL635_9-01 | 103110102 |

TABLE 1-continued

Beep Tone Event List

| Track Number | Event Time Offset | Event Time Offset | | Type of Event | Name of Track | Length of Event |
|---|---|---|---|---|---|---|
| 3 | 00:01:01:04 | 31:03:029 | [[N/a]] | Audio | DL635_9-03 | 103108570 samples |
| 1 | 00:02:04:13 | 63:01:105 | [[N/a]] | Audio | DL635_9-01 | 103110024 samples |
| 3 | 00:02:28:18 | 75:02:024 | [[N/a]] | Audio | DL635_9-03 | 103108830 samples |
| 2 | 00:02:31:24 | 76:04:073 | [[N/a]] | Audio | DL635_9-02 | 103130260 samples |
| 1 | 00:02:52:23 | 87:02:063 | [[N/a]] | Audio | DL635_9-01 | 103110165 samples |
| 4 | 00:03:03:04 | 92:03:035 | [[N/a]] | Audio | DL635_9-04 | 103119874 samples |
| 2 | 00:03:44:12 | 113:01:094 | [[N/a]] | Audio | DL635_9-02 | 103132902 samples |
| 3 | 00:03:51:20 | 116:04:038 | [[N/a]] | Audio | DL635_9-03 | 103108746 samples |
| 1 | 00:04:33:07 | 137:03:055 | [[N/a]] | Audio | DL635_9-01 | 103110160 samples |
| 4 | 00:04:36:26 | 139:02:084 | [[N/a]] | Audio | DL635_9-04 | 103119964 samples |
| 2 | 00:05:07:22 | 154:04:056 | [[N/a]] | Audio | DL635_9-02 | 103134534 samples |
| 3 | 00:05:13:14 | 157:03:113 | [[N/a]] | Audio | DL635_9-03 | 103108819 samples |
| 1 | 00:05:37:06 | 169:03:047 | [[N/a]] | Audio | DL635_9-01 | 103110171 samples |
| 1 | 00:05:46:06 | 174:01:048 | [[N/a]] | Audio | DL635_9-01 | 103109846 samples |
| 4 | 00:06:13:20 | 187:04:040 | [[N/a]] | Audio | DL635_9-04 | 103119816 samples |
| 3 | 00:06:28:03 | 195:01:025 | [[N/a]] | Audio | DL635_9-03 | 103108856 samples |
| 2 | 00:06:28:12 | 195:01:098 | [[N/a]] | Audio | DL635_9-02 | 103135483 samples |
| 1 | 00:07:13:24 | 217:04:072 | [[N/a]] | Audio | DL635_9-01 | 103109999 samples |
| 3 | 00:07:46:25 | 234:02:080 | [[N/a]] | Audio | DL635_9-03 | 103108627 samples |
| 2 | 00:07:48:28 | 235:02:101 | [[N/a]] | Audio | DL635_9-02 | 103134700 samples |
| 4 | 00:08:15:23 | 248:04:062 | [[N/a]] | Audio | DL635_9-04 | 103119851 samples |
| 4 | 00:08:27:27 | 254:04:098 | [[N/a]] | Audio | DL635_9-04 | 1035118 samples |
| 1 | 00:08:34:02 | 258:01:016 | [[N/a]] | Audio | DL635_9-01 | 103110057 samples |
| 2 | 00:09:19:10 | 280:03:080 | [[N/a]] | Audio | DL635_9-02 | 103133073 samples |
| 3 | 00:09:29:25 | 285:04:080 | [[N/a]] | Audio | DL635_9-03 | 103108992 samples |
| 4 | 00:10:04:22 | 303:02:056 | [[N/a]] | Audio | DL635_9-04 | 103119861 samples |
| 1 | 00:10:11:18 | 306:04:024 | [[N/a]] | Audio | DL635_9-01 | 103110204 samples |
| 2 | 00:10:41:07 | 321:03:056 | [[N/a]] | Audio | DL635_9-02 | 103132478 samples |
| 3 | 00:10:59:12 | 330:03:092 | [[N/a]] | Audio | DL635_9-03 | 103108991 samples |
| 1 | 00:11:02:28 | 332:02:106 | [[N/a]] | Audio | DL635_9-01 | 103110199 samples |
| 4 | 00:11:14:12 | 338:01:092 | [[N/a]] | Audio | DL635_9-04 | 103119791 samples |
| 2 | 00:12:05:23 | 363:04:060 | [[N/a]] | Audio | DL635_9-02 | 103131264 samples |
| 1 | 00:12:21:21 | 371:04:044 | [[N/a]] | Audio | DL635_9-01 | 103110432 samples |
| 3 | 00:12:22:22 | 372:02:055 | [[N/a]] | Audio | DL635_9-03 | 103131300 samples |
| 2 | 00:13:09:15 | 395:04:000 | [[N/a]] | Audio | DL635_9-02 | 103131054 samples |
| 3 | 00:13:19:10 | 400:03:083 | [[N/a]] | Audio | DL635_9-03 | 103131160 samples |
| 4 | 00:13:21:25 | 401:04:078 | [[N/a]] | Audio | DL635_9-04 | 103119998 |

TABLE 1-continued

Beep Tone Event List

| Track Number | Event Time Offset | Event Time Offset | Type of Event | Name of Track | Length of Event |
|---|---|---|---|---|---|
| 1 | 00:13:47:22 | 414:04:056 | [[N/a]] | Audio | DL635_9-01 | 103110331 samples |
| 4 | 00:14:06:09 | 424:01:073 | [[N/a]] | Audio | DL635_9-04 | 103119972 samples |
| 2 | 00:14:32:08 | 437:01:061 | [[N/a]] | Audio | DL635_9-02 | 103130274 samples |
| 3 | 00:14:44:13 | 443:01:100 | [[N/a]] | Audio | DL635_9-03 | 103130687 samples |
| 1 | 00:15:18:11 | 460:01:091 | [[N/a]] | Audio | DL635_9-01 | 103110266 samples |
| 4 | 00:15:21:11 | 461:03:089 | [[N/a]] | Audio | DL635_9-04 | 103119781 samples |
| 3 | 00:15:35:18 | 468:04:021 | [[N/a]] | Audio | DL635_9-03 | 103130485 samples |
| 2 | 00:15:48:09 | 475:01:075 | [[N/a]] | Audio | DL635_9-02 | 103129974 samples |
| 1 | 00:16:40:26 | 501:02:087 | [[N/a]] | Audio | DL635_9-01 | 103110442 samples |
| 2 | 00:17:17:04 | 519:03:032 | [[N/a]] | Audio | DL635_9-02 | 103129483 samples |
| 4 | 00:17:27:14 | 524:03:109 | [[N/a]] | Audio | DL635_9-04 | 103119840 samples |
| 3 | 00:17:38:08 | 530:01:062 | [[N/a]] | Audio | DL635_9-03 | 103130077 samples |
| 3 | 00:17:51:04 | 536:03:030 | [[N/a]] | Audio | DL635_9-03 | 103130271 samples |
| 3 | 00:17:55:09 | 538:03:073 | [[N/a]] | Audio | DL635_9-03 | 103129414 samples |
| 1 | 00:18:07:25 | 544:04:076 | [[N/a]] | Audio | DL635_9-01 | 103110332 samples |
| 2 | 00:18:32:19 | 557:02:029 | [[N/a]] | Audio | DL635_9-02 | 103129358 samples |
| 2 | 00:19:04:09 | 573:01:071 | [[N/a]] | Audio | DL635_9-02 | 103129340 samples |
| 4 | 00:19:14:01 | 578:01:009 | [[N/a]] | Audio | DL635_9-04 | 103119774 samples |
| 1 | 00:19:28:08 | 585:01:065 | [[N/a]] | Audio | DL635_9-01 | 103110496 samples |
| 3 | 00:19:33:09 | 587:03:073 | [[N/a]] | Audio | DL635_9-03 | 103130012 samples |
| 2 | 00:20:30:20 | 616:02:039 | [[N/a]] | Audio | DL635_9-02 | 103129050 samples |
| 4 | 00:20:31:26 | 616:04:090 | [[N/a]] | Audio | DL635_9-04 | 103119869 samples |
| 3 | 00:20:49:15 | 625:04:000 | [[N/a]] | Audio | DL635_9-03 | 103129239 samples |
| 1 | 00:21:18:06 | 640:01:048 | N/A | Audio | DL635_9-01 | 103110533 samples |
| 3 | 00:21:36:12 | 649:01:094 | [[N/a]] | Audio | DL635_9-03 | 103129429 samples |
| 2 | 00:21:54:21 | 658:02:050 | [[N/a]] | Audio | DL635_9-02 | 103128907 samples |
| 4 | 00:22:16:05 | 669:01:040 | [[N/a]] | Audio | DL635_9-04 | 103119500 samples |
| 3 | 00:22:35:02 | 678:03:016 | [[N/a]] | Audio | DL635_9-03 | 103129086 samples |
| 1 | 00:22:39:07 | 680:03:052 | [[N/a]] | Audio | DL635_9-01 | 103110547 samples |
| 2 | 00:23:06:18 | 694:02:026 | [[N/a]] | Audio | DL635_9-02 | 103128686 samples |
| 4 | 00:23:40:29 | 711:02:109 | [[N/a]] | Audio | DL635_9-04 | 103119642 samples |
| 3 | 00:23:51:12 | 716:03:095 | [[N/a]] | Audio | DL635_9-03 | 103128986 samples |
| 2 | 00:24:23:09 | 732:03:068 | [[N/a]] | Audio | DL635_9-02 | 103128691 samples |
| 1 | 00:24:35:23 | 738:04:065 | [[N/a]] | Audio | DL635_9-01 | 103110677 samples |
| 3 | 00:24:49:12 | 745:03:094 | [[N/a]] | Audio | DL635_9-03 | 103128753 samples |
| 4 | 00:25:19:13 | 760:03:101 | [[N/a]] | Audio | DL635_9-04 | 103119781 samples |
| 2 | 00:25:33:18 | 767:04:027 | [[N/a]] | Audio | DL635_9-02 | 103128639 |

TABLE 1-continued

Beep Tone Event List

| Track Number | Event Time Offset | Event Time Offset | Type of Event | Name of Track | Length of Event |
|---|---|---|---|---|---|
| 1 | 00:25:52:13 | 777:01:105 | [[N/a]] Audio | DL635_9-01 | 103110531 samples |
| 3 | 00:26:12:06 | 787:01:051 | [[N/a]] Audio | DL635_9-03 | 103128647 samples |
| 4 | 00:26:39:04 | 800:03:029 | [[N/a]] Audio | DL635_9-04 | 103119741 samples |
| 1 | 00:27:03:06 | 812:03:045 | [[N/a]] Audio | DL635_9-01 | 103110507 samples |
| 2 | 00:27:06:18 | 814:02:020 | [[N/a]] Audio | DL635_9-02 | 103128618 samples |
| 3 | 00:27:56:02 | 839:01:017 | [[N/a]] Audio | DL635_9-03 | 103128500 samples |
| 1 | 00:28:20:23 | 851:02:061 | [[N/a]] Audio | DL635_9-01 | 103110416 samples |
| 4 | 00:28:25:15 | 853:03:118 | [[N/a]] Audio | DL635_9-04 | 103119670 samples |
| 2 | 00:28:31:09 | 856:03:071 | [[N/a]] Audio | DL635_9-02 | 103128497 samples |
| 2 | 00:28:59:18 | 870:04:020 | [[N/a]] Audio | DL635_9-02 | 103128430 samples |
| 4 | 00:29:39:09 | 890:03:074 | [[N/a]] Audio | DL635_9-04 | 1034917 samples |
| 1 | 00:29:59:25 | 900:04:078 | [[N/a]] Audio | DL635_9-01 | 1037642 samples |
| 3 | 00:29:59:25 | 900:04:079 | [[N/a]] Audio | DL635_9-03 | 1037510 samples |

Descriptive data for each event includes: time-offset for the event, track number for the event, amplitude for the event and sample length for the event. Events that fall below a particular amplitude and sample length threshold value are identified as anomalies and removed.

Anomaly detection and removal is performed by a software application. This application uses sample length to determine whether an event is or is not an index tone. In one embodiment, the threshold sample length is 6000 samples i.e., any event with a sample length that falls below the threshold level—below 6000 samples—is identified as an anomaly and removed. All events larger than 6000 samples are identified as proper index tone events and retained. The sample length threshold value can be adjusted to accommodate index tone definitions other than the RFB&D specification.

Namely, in order to improve the accuracy of the index tone detection and interpretation method, a subtractive process involving a series of filters, gates, silence detection and removal, and anomaly detection and removal is employed. More specifically, the index tone detection function accommodates an adjustable percentage of deviation from the formal index tone specification at the input to the process and in two, decision making passes, isolates acceptable events and removes anomalous events. At the input to the process, multiple filters and gates pass events that fall within a prescribed range of values. The strength of the passed events is amplified. Silence detection and removal is employed to isolate the amplified events. Data describing each event is collected and used to identify and remove any remaining anomalies. Index tone time-offsets are extracted. The-offset data is interpreted so that page and chapter index tones are identified and uniquely described as discussed below.

Next, time-offset data is interpreted and events are identified uniquely as pages or chapters. This is accomplished by measuring the time between consecutive index tone events. If the time between consecutive events falls below a particular threshold value, the second time-offset is discarded. The time-offset of the first event is retained and identified as a chapter event. If the time between consecutive events exceeds a particular threshold value, both event time-offsets are retained and identified as page events. Time-offsets are then adjusted for standard speed playback since time-offsets represent audio playback at twice standard speed.

Specifically, the application uses time between events to distinguish between page and chapter tones. If the second event of two consecutive events falls below a particular threshold value, those events are taken to represent a single CHAPTER event. The time offset of the first event is taken to represent the time location for the single chapter event. If the second event of two consecutive events meets or exceeds the threshold, then the events are taken separately as PAGE events. Individual time offsets for PAGE events are retained as an indication of the time location of each of the pages. In one embodiment, the time threshold is set to 17,500 ms. The time threshold can be adjusted to accommodate index tone definitions other than the RFB&D specification.

The present tone detection process can be identified as subtractive since the process starts by allowing a wide range of events to pass, then, at each successive stage of the process, anomalous events are stripped away until only valid index tone events remain. This process draws its inspiration from the subtractive sound synthesis. Subtractive synthesis means that a sound is selected and routed through a filter and amplifier to change its timbre. This reduces the level of some partials of the original spectrum, hence the term subtractive. In the same manner, audio in the present system is processed through successive filters, which amplify index tones and reduce and eventually eliminate non-index tone elements of the audio. In the first stage of this subtractive process, audio is processed in real time through four successive filters and a gate. Each successive filter pass amplifies any audio within +/−10 Hz of a center frequency of 120 Hz (60 Hz beep tones at 2× speed) and then amplifies the filtered output. The center frequency for these bandpass filters can be adjusted to accommodate index tone definitions other than the RFB&D specification. The gate filter opens only to allow audio with amplitude greater than −50 db to pass. The gate filter remains closed against any audio with an amplitude less than −50 db, thereby preventing this audio from passing and being considered in subsequent passes of the subtractive index tone detection process. The next stage after this real-time filtering and gating process is the silence detection and removal process described above.

In sum, as the four channels routed to index tone detection processing are fed into the computer 140, these signals are processed by a series of filters and gates to amplify possible index tone events and suppress irrelevant data. The series of filters and gates allow only audio which falls within a particular range of prescribed values to pass as possible index tone events. Parameters which have ranges of values described for them includes at least: dominant frequency and amplitude. The allowable range of values can be narrowed or widened as desired to reflect the type of input anticipated. For instance, if input which varied widely from a particular specification were expected, a wide range of values would be set to accommodate the varying characteristics of the input.

In step 260, method 200 initiates quality improvement processing. Specifically, method 200 initiates pitch correction and audio optimization. Since the analog tape is played back at 2× speed while being fed into the system, the audio signal must under go pitch correction to slow the audio for standard playback. Audio is also optimized for encoding to audio compression formats.

Specifically, all final audio adjustments and quality improvement are accomplished using software application. Audio is adjusted from 2× speed playback to standard speed playback by performing pitch correction on the audio files. Pitch correcting the audio by a factor of −11 semitones slows the audio for standard speed playback. Audio is optimized for conversion to audio compression formats (Mp3, RealAudio, etc.) by removing low frequencies below 60 Hz, boosting the high bass (120–200 Hz) and upper midrange frequencies (2–6 kHz). The files are then normalized so that all audio has equal amplitude.

In step 270, the improved and "cleaned-up" digitized audio signals are again stored and saved as files for use as the digital audio signal for the digital talking book. Method 200 then ends in step 280.

In an alternate embodiment, to further improve the efficiency of the conversion system, digitization and quality improvement processing of the audio signal occurs simultaneously, in real-time, with the detection and amplification of possible index tone events. Specifically, all processing of audio channels described above, four channels of index tone detection processing and four channels of audio quality improvement processing, occur simultaneously, in real-time as the audio signal is being fed into the computer 140. This means that index tone processing and audio quality improvement processing occur almost simultaneously within the thirty minutes required to play and feed the analog tape source into the system.

Furthermore, all processing is controlled by software, which draws 100% of its processing power from an array of Digital Signal Processors (DSPs) on the soundcard 146. Since DSPs are used to power the processing on the eight audio channels, the host (computer) processor 142 is minimally taxed by the processing. This allows the required large amount of simultaneous processing to occur, even when utilizing a relatively modest computer configuration.

Namely, control of the soundcard, routing and assignment of analog interface input channels are handled via a software application. As the pair of duplicate four-channel groups is fed into the computer 140 via the analog interface, all eight tracks of audio undergo an analog to digital conversion. One four-channel group is routed, via the software, to index tone detection processing. The second four-channel group is routed, via the software, to audio quality improvement processing.

The above approach allows all the complex conversion processes to be software controlled and automated. Specifically, a modular design allows a configuration in which various commercial software can be controlled by a custom "front end." The output of a single four-track tape machine can be switched between two computers 140 to increase the overall efficiency of the system.

Although various embodiments which incorporate the teachings of the present invention have been shown and described in detail herein, those skilled in the art can readily devise many other varied embodiments that still incorporate these teachings.

What is claimed is:

1. A method for detecting index tone in an existing analog audio signal as it is converted into a digital audio signal for a digital talking book, said method comprising the steps of:
    a) detecting a plurality of silence events in the digital audio signal as potential index tones;
    b) measuring sample lengths of each of said potential index tones for detecting and removing an anomaly index tone from said potential index tones; and
    c) associating said remaining potential index tones with pages and chapters of the digital talking book.

2. The method of claim 1, wherein said measuring step b) removes a potential index tone as an anomaly index tone if a measured sample length of said potential index tone fails below a threshold level.

3. The method of claim 2, wherein said threshold level is approximately 6000 samples.

4. The method of claim 2, wherein said associating step c) associates said remaining potential index tones with pages and chapters by interpreting time-offset data.

5. The method of claim 4, wherein if a time-offset between two consecutive potential index tones falls below a threshold, then a second potential index tone from said two consecutive potential index tones is discarded and a first potential index tone from said two consecutive potential index tones is taken to present a chapter event.

6. The method of claim 4, wherein if a time-offset between two consecutive potential index tones exceeds a threshold, then both potential index tones are identified as page events.

7. The method of claim 5, wherein said threshold is approximately 17,500 ms.

8. The method of claim 6, wherein said threshold is approximately 17,500 ms.

9. The method of claim 1, wherein said analog audio signal having four channel outputs is split into four channel pairs having a total of eight channels.

10. The method of claim 1, further comprising the step of:
    d) applying adjustment to said digitized audio signal by applying pitch correction.

11. The method of claim 1, further comprising the step of:
    d) applying adjustment to said digitized audio signal by removing low frequencies, and boosting high bass and upper midrange frequencies.

12. The method of claim 1, wherein said index tone detection steps (a–c) and said adjustment step d) are performed in parallel.

13. A computer-readable medium having stored thereon a plurality of instructions, the plurality of instructions including instructions which, when executed by a processor, cause the processor to perform the steps of a method for detecting index tone in an existing analog audio signal as it is converted into a digital audio signal for a digital talking book, comprising of:
   a) detecting a plurality of silence events in the digital audio signal as potential index tones;
   b) measuring sample lengths of each of said potential index tones for detecting and removing an anomaly index tone from said potential index tones; and
   c) associating said remaining potential index tones with pages and chapters of the digital talking book.

14. The computer-readable medium of claim 13, wherein said measuring step b) removes a potential index tone as an anomaly index tone if a measured sample length of said potential index tone falls below a threshold level.

15. The computer-readable medium of claim 14, wherein said associating step c) associates said remaining potential index tones with pages and chapters by interpreting time-offset data.

16. The computer-readable medium of claim 15, wherein if a time-offset between two consecutive potential index tones falls below a threshold, then a second potential index tone from said two consecutive potential index tones is discarded and a first potential index tone from said two consecutive potential index tones is taken to present a chapter event.

17. The computer-readable medium of claim 15, wherein if a time-offset between two consecutive potential index tones exceeds a threshold, then both potential Index tones are identified as page events.

18. The computer-readable medium of claim 13, further comprising the step of:
   d) applying adjustment to said digitized audio signal by applying pitch correction.

19. The computer-readable medium of claim 13, further comprising the step of:
   d) applying adjustment to said digitized audio signal by removing low frequencies, and boosting high bass and upper midrange frequencies.

20. An apparatus for detecting index tone in an existing analog audio signal as it is converted into a digital audio signal for a digital talking book, said apparatus comprising:
   means for detecting a plurality of silence events in the digital audio signal as potential index tones;
   means for measuring sample lengths of each of said potential index tones for detecting and removing an anomaly index tone from said potential index tones; and
   means for associating said remaining potential index tones with pages and chapters of the digital talking book.

* * * * *